United States Patent
Binkley et al.

(10) Patent No.: US 11,694,223 B2
(45) Date of Patent: *Jul. 4, 2023

(54) MANAGEMENT OF MOVING OUTDOOR ADVERTISING

(71) Applicant: HaulerAds Inc., Toronto (CA)

(72) Inventors: Casey Mansel Binkley, Toronto (CA); Zachary Aaron Levy, Toronto (CA)

(73) Assignee: HaulerAds Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,922

(22) Filed: Dec. 2, 2021

(65) Prior Publication Data

US 2022/0092640 A1 Mar. 24, 2022

Related U.S. Application Data

(63) Continuation of application No. 16/012,278, filed on Jun. 19, 2018, now Pat. No. 11,222,355.

(60) Provisional application No. 62/653,894, filed on Apr. 6, 2018.

(51) Int. Cl.
*G06Q 30/00* (2023.01)
*G06Q 30/0242* (2023.01)
*G09F 21/04* (2006.01)
*G06Q 30/0251* (2023.01)

(52) U.S. Cl.
CPC ..... *G06Q 30/0246* (2013.01); *G06Q 30/0266* (2013.01); *G09F 21/04* (2013.01)

(58) Field of Classification Search
CPC ........... G06Q 30/0265; G06Q 30/0242; G06Q 30/0246; G09F 21/04
See application file for complete search history.

(56) References Cited

U.S. PATENT DOCUMENTS

| | | | |
|---|---|---|---|
| 7,734,503 B2 | 6/2010 | Champagne | |
| 9,293,042 B1 | 3/2016 | Wasserman | |
| 9,965,768 B1 | 5/2018 | Doane et al. | |
| 10,783,559 B1 | 9/2020 | Tran | |
| 11,222,355 B2 * | 1/2022 | Binkley | G06Q 30/0246 |
| 11,392,990 B2 * | 7/2022 | Binkley | G06Q 30/0267 |
| 2009/0150242 A1 | 6/2009 | Del Cogliano | |
| 2012/0239503 A1 | 9/2012 | Cohen | |
| 2012/0324494 A1 | 12/2012 | Burger et al. | |
| 2015/0095124 A1 | 4/2015 | Felt et al. | |

(Continued)

FOREIGN PATENT DOCUMENTS

CN 101398996 4/2009

*Primary Examiner* — Meredith A Long

(57) ABSTRACT

An advertising campaign may be carried out using moving outdoor advertising. Advertisers typically like to manage and track the success of their advertising campaigns. Aspects of the present application may be seen to assist with such management and tracking by providing impression analytics, location analytics, time analytics and frequency reports. Furthermore, aspects of the present application may be seen to provide an ability to augment a moving outdoor advertising campaign with a mobile device retargeting advertising campaign. Then, such metrics as return on investment, profit and gross profit may be tracked. In some aspects, Wi-Fi signals and Bluetooth signals may be collected from mobile devices that are in the range of a Moving Impression Analytics Tracking Device.

22 Claims, 5 Drawing Sheets

(56) References Cited

U.S. PATENT DOCUMENTS

2016/0275566 A1 9/2016 Sparrow et al.
2017/0132663 A1 5/2017 High et al.

\* cited by examiner

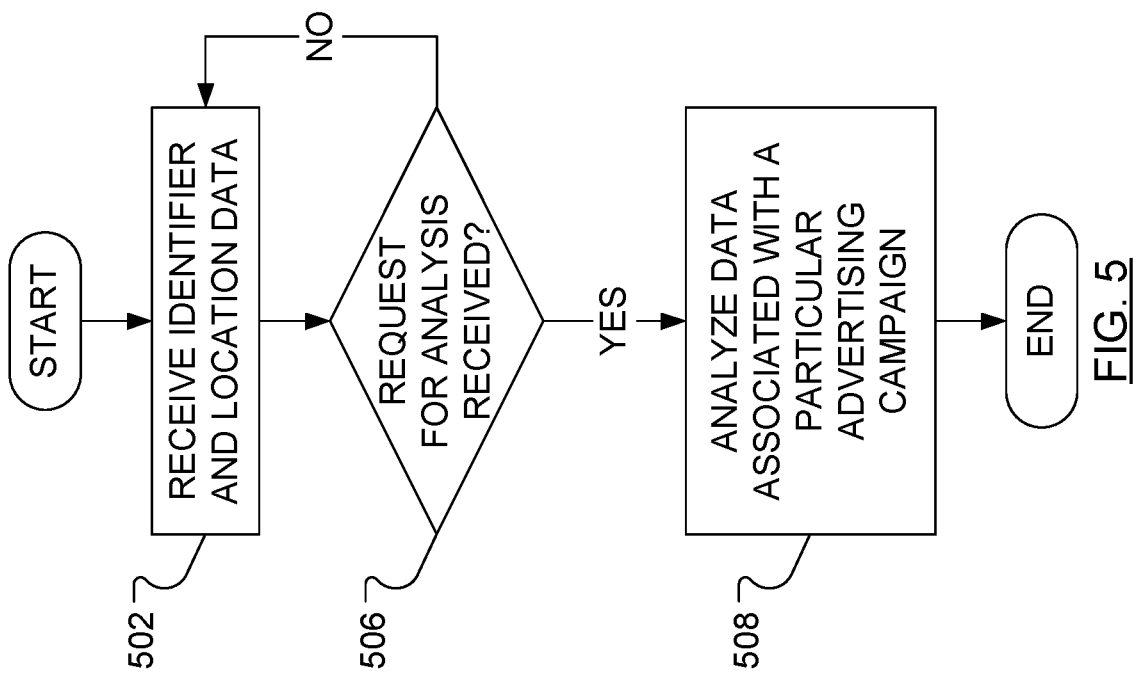

MANAGEMENT OF MOVING OUTDOOR ADVERTISING

CROSS-REFERENCE TO RELATED APPLICATIONS

This application is a continuation of U.S. patent application Ser. No. 16/012,278 filed May 19, 2018, which claims the benefit of priority to U.S. Provisional Patent Application No. 62/653,894 filed Apr. 6, 2018 and entitled MANAGEMENT OF MOVING OUTDOOR ADVERTISING, all the contents of which are herein incorporated by reference into the DETAILED DESCRIPTION herein below.

FIELD

The present application relates generally to advertising and, more specifically, to management of moving outdoor advertising.

BACKGROUND

Outdoor advertising is one of the oldest types of advertising known to exist. Outdoor advertising also may be considered a type of advertising that is ubiquitous. That is, in today's society, it may be considered to be impossible to not see billboard advertising, transit vehicle advertising, bus shelter advertising and transit bench advertising; all of which may be termed "Outdoor Advertising" or "Out of Home Advertising."

An advertising campaign may be carried out using moving outdoor advertising.

Advertisers typically like to manage and track the success of their advertising campaigns.

BRIEF DESCRIPTION OF THE DRAWINGS

Reference will now be made, by way of example, to the accompanying drawings which show example implementations; and in which:

FIG. 5 illustrates example steps in a method of providing analytics according to aspects of the present application.

DETAILED DESCRIPTION

Figure 1:
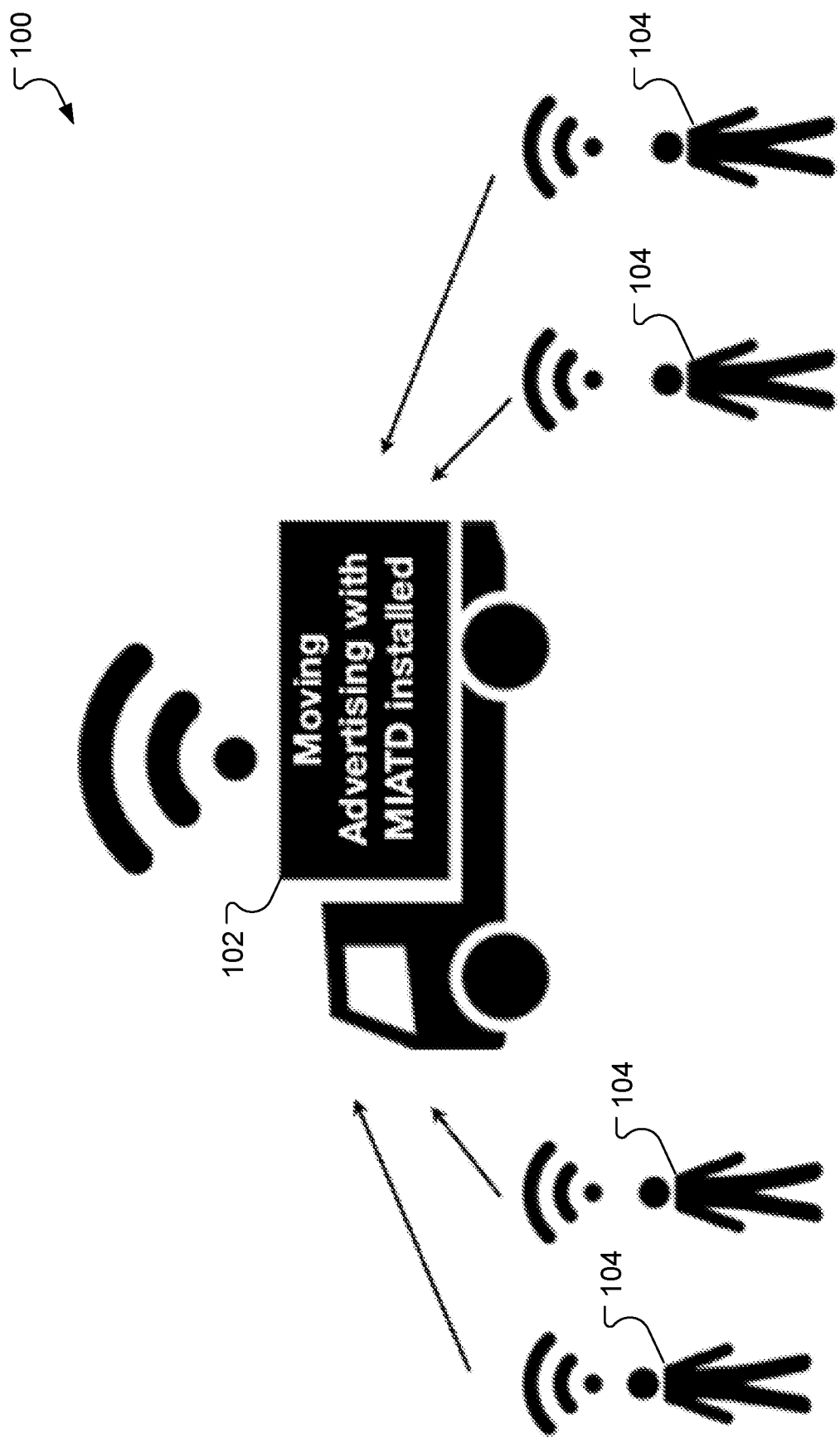
FIG. 1 illustrates a vehicle equipped to advertise and collect impression information according to aspects of the present application.

It may be considered that the vast majority of Outdoor Advertising is carried out for the purposes of general brand awareness. It may be speculated that a lack of Outdoor Advertising carried out for the purposes of promoting specific products is due to a perception that so-called "conversion metrics" are hard, if not impossible, to determine for Outdoor Advertising.

"Moving" or "Mobile" Outdoor Advertising has become more prevalent in recent years, as advertisers seek out new and more effective ways to advertise. This increase in prevalence may be due to a number of factors including, but not limited to, an overall increase in Outdoor Advertising spending and a shrinking supply of traditional, static Outdoor Advertising locations such as billboards or "wallscapes."

Advertising on handheld mobile devices has also become popular recently, responsive to a boom in use of smart phones and smart devices. For example, as the number of people using mobile devices has increased dramatically, advertisers have come to rely on media and services offered over mobile devices as a way to advertise. Retargeting tools offered for mobile phones and mobile devices enable advertisers to measure effectiveness for specific advertising campaigns. Such retargeting tools are known to have accurate analytics regarding conversions, activations and sign ups.

Targeted Ads are more likely to be meaningful to end users since the advertisement is more relevant to users activities.

Aspects of the present application offer advertisers an ability to combine outdoor advertising impression analytics with mobile retargeting tools to, thereby, close a perceived gap between so-called "Awareness Advertising" and "Conversion-Based Advertising" for moving outdoor advertising.

For example, Company X wants to participate in Moving/Mobile Outdoor Advertising with Retargeting abilities. Once signage has been installed on to a vehicle for the purposes of moving advertising, aspects of the present application may be installed into the same vehicle.

When a given passer-by having a mobile device with an active Wi-Fi radio or an active Bluetooth radio, aspects of the present application relate to sensing the active radio and collecting data specific to the mobile device.

The collected data may then be used to target advertising, via a Mobile Device Retargeting System, to the given passer-by. Accordingly, conversion metrics may be tracked, where the conversion metrics are specific to the moving advertising.

In electronic commerce, "conversion marketing" is a type of marketing associated with intention of increasing a quantity of conversions. A "conversion" is a site visitor that is converted into a paying customer. The process of improving a conversion rate is called conversion rate optimization. Notably, different commercial entities may define the term "conversion" to be some sort of result other than a sale.

It is known to track conversion metrics associated with static advertising. However, many factors contribute to less than satisfactory results. Such factors include signal variability and directional interferences. Indeed, a static billboard can only be seen within a range of angles on the front side of the billboard.

Wi-Fi signals and Bluetooth signals are both electromagnetic signals that vary in strength based, in part, on distance and multipath interference. Notably, data from electromagnetic signals that emanate from a mobile device positioned behind a static outdoor advertisement may be collected in a manner that does not take into account that the individual associated with the mobile device cannot see the static outdoor advertisement. Accordingly, a Mobile Device Retargeting System may incorrectly target the individual for follow-up mobile device advertising. Such incorrect targeting may be considered to be a waste of an advertiser's budget, since individuals that have not experienced the initial influence of the static outdoor advertisement may be considered unsuitable for follow-up mobile device advertising.

An advertising campaign may be carried out using moving outdoor advertising. Advertisers typically like to manage and track the success of their advertising campaigns. Aspects of the present application may be seen to assist with such management and tracking by providing impression analytics, location analytics, time analytics and frequency reports. Furthermore, aspects of the present application may be seen to provide an ability to augment a moving outdoor advertising campaign with a mobile device retargeting advertising campaign. Then, such metrics as return on investment, profit and gross profit may be tracked. In some aspects, Wi-Fi signals and Bluetooth signals may be collected from mobile devices that are in the range of a Moving Impression Analytics Tracking Device.

Manifestations consistent with aspects of the present application may be used to help advertisers manage and optimize outdoor advertising and retargeting advertising campaigns. For example, at least one manifestation consistent with aspects of the present application may help advertisers by estimating and/or tracking some business metric, such as return on investment (ROI), gross profit, profit, etc., with respect to an outdoor advertising campaign in relation to campaign analytics and or retargeting enabled by aspects of the present application.

For advertisers to avoid wasting budget allocations and gain desired results, the advertisers prefer accurate analytics related to campaigns performance. It may be considered that aspects of the present application enable advertisers to track metrics such as ROI, gross profit and profit for a particular advertising campaign, both in real time and for past time frames. Advertisers can use these metrics to gain an understanding of campaign performance. That understanding can be employed when making informed decisions regarding whether to continue the campaign, stop the campaign, expand the campaign, etc. The advertiser can also set campaign limits on a number of outdoor advertising impressions to target, thereby avoiding overspending or underspending.

According to an aspect of the present disclosure, there is provided a method of collecting impression information. The method includes scanning radio frequencies, collecting, based on the scanning, an identifier of a mobile communication device, polling a global positioning module to determine location information and processing the identifier in association with the location information.

According to an aspect of the present disclosure, there is provided a system for collecting impression information. The system includes a vehicle, a means for displaying advertising on an external surface of the vehicle and a moving impression analytics tracking device. The moving impression analytics tracking device includes a wireless local area network adapter configured to scan radio frequencies, a global positioning module and a central processing unit. The central processing unit is configured to collect, based on the scanning, an identifier of a mobile communication device, poll the global positioning module to determine location information and process the identifier in association with the location information.

Other aspects and features of the present disclosure will become apparent to those of ordinary skill in the art upon review of the following description of specific implementations of the disclosure in conjunction with the accompanying figures.

In overview, a mobile vehicle is festooned with advertising. While in a target area, a device carried by the vehicle, representative of aspects of the present application, collects impression information. Impression information may be collected by uniquely identifying each mobile device with a radio that is sensed by the device. The impression information may be processed in association with location information, where the location information specifies the location of the vehicle at the time that the impression information was collected.

FIG. 1 illustrates an environment 100 in which aspects of the present application may find use. The environment 100 includes a plurality of people 104. As is common in the present day, each of the people 104 is expected to be associated with a mobile communication device (not explicitly shown). The term mobile communication device may be understood to encompass feature cellular telephones, smart phones, tablet computers and notebook computers, among an increasingly wide variety of wireless network-connectable mobile devices. Furthermore, each mobile communication device is assumed to have at least one radio activated. For example, a Wi-Fi radio is typically included in a mobile communication device. Additionally, a Bluetooth radio is typically included in a mobile communication device.

The environment 100 also includes a vehicle 102. The vehicle 102 may be, for several non-limiting examples, a delivery truck, a semi-trailer, a taxi cab, a bicycle, a commuter vehicle, a bus, a train, a street car, a subway car, an airplane or a boat.

Figure 2:
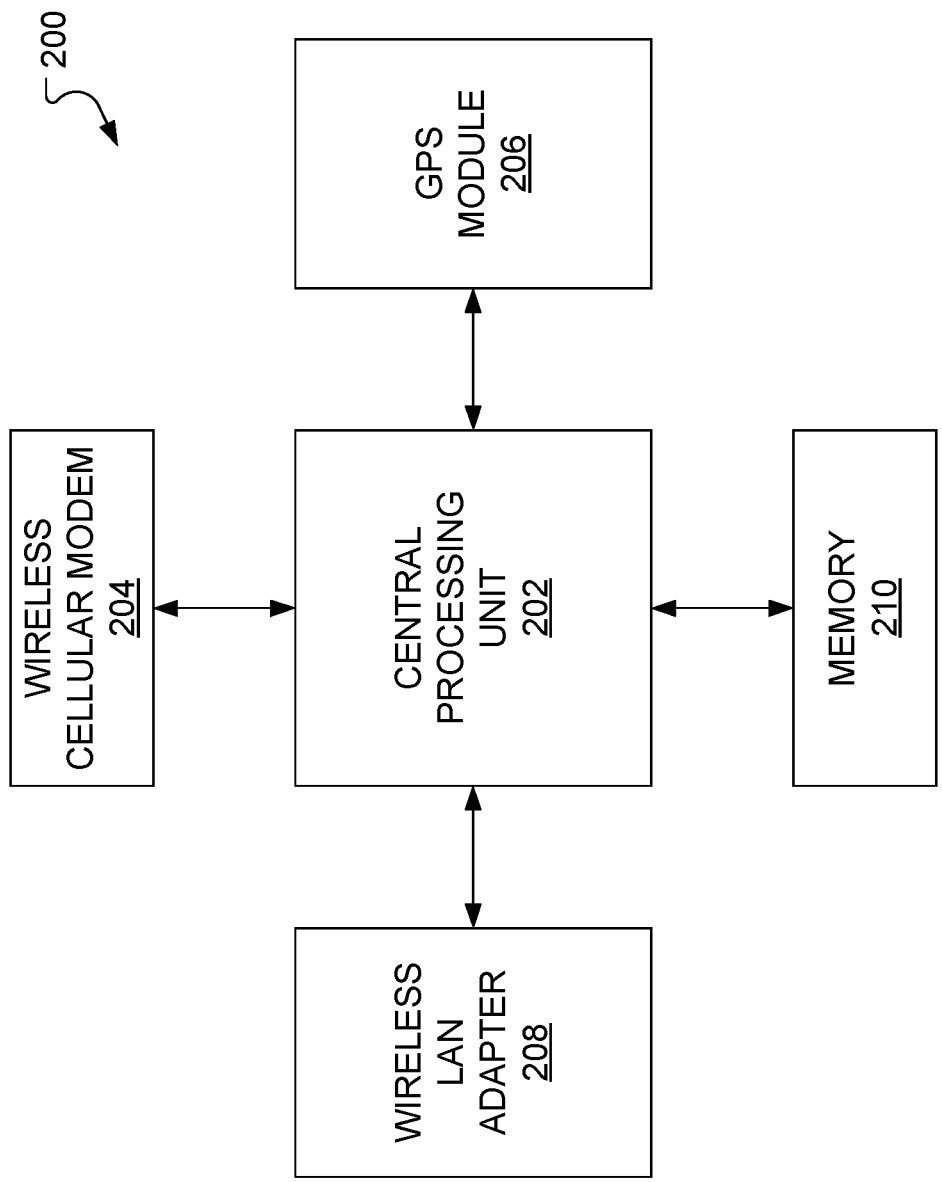
FIG. 2 illustrates, in block diagram format, a device for collecting impression information according to aspects of the present application.

According to aspects of the present application, the vehicle 102 displays advertising and carries a Moving Impression Analytics Tracking Device ("MIATD," 200, see FIG. 2). The MIATD 200 is adapted to track the location of the vehicle 102 using known Global Positioning System (GPS) technology. The MIATD 200 is also adapted to scan Wi-Fi radio frequencies using a Universal Serial Bus (USB) Wi-Fi adapter. Additionally, the MIATD 200 may be adapted to scan Bluetooth radio frequencies.

In accordance with standards related to the operation of a Wi-Fi radio, a mobile communication device with the Wi-Fi radio enabled typically broadcasts an identifier that uniquely identifies the mobile communication device.

In accordance with standards related to the operation of a Bluetooth radio, a mobile communication device with the Bluetooth radio enabled typically broadcasts an identifier that uniquely identifies the mobile communication device.

FIG. 2 illustrates a hardware configuration for the MIATD 200. The MIATD includes a Central Processing Unit (CPU) 202. In one implementation, the CPU is a Raspberry Pi (both version 0 and version 3 have been successfully used). Connected to the CPU 202 may be a wireless cellular modem 204. Colloquially, the wireless cellular modem 204 may be referred to as a "3G dongle." The "3G" part of the name is a reference to a third generation of wireless mobile telecommunications technology. Other telecommunications technologies may be used including General Packet Radio Service, long term evolution (LTE) telecommunications technologies and 4G (soon, 5G) telecommunications technologies. Also connected to the CPU 202 may be a global positioning system (GPS) module 206. The CPU 202 further maintains a connection to a wireless local area network (LAN) adapter 208 and a memory 210.

Figure 3:
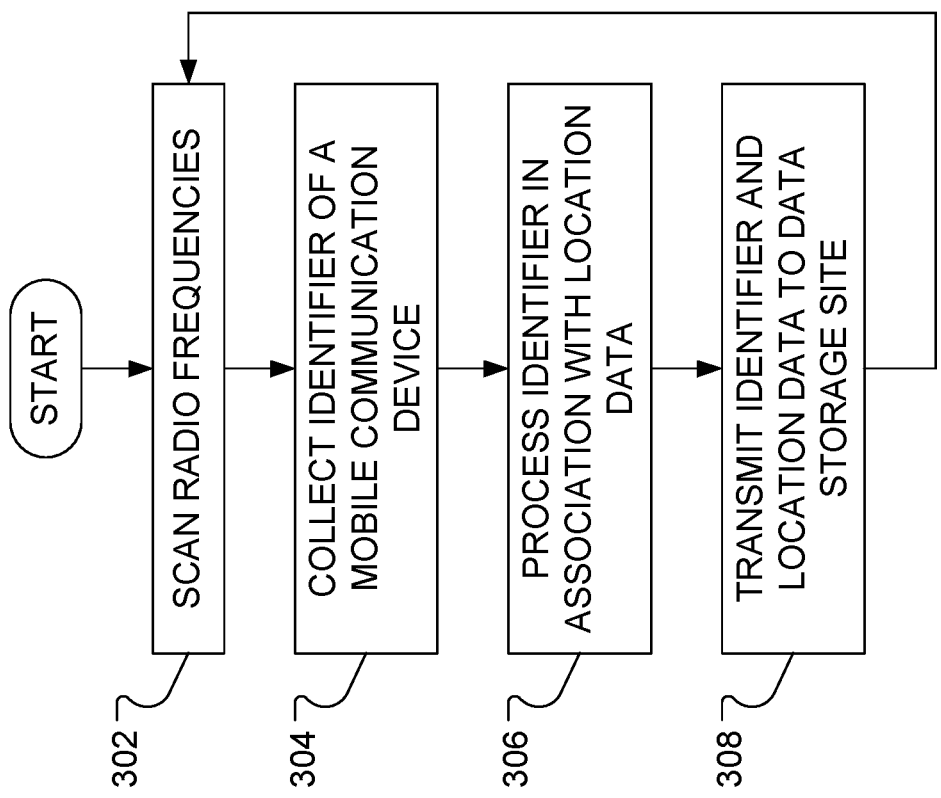
FIG. 3 illustrates example steps in a method of scanning impression information according to aspects of the present application.

FIG. 3 illustrates example steps in a method to be carried out at the MIATD 200 as the vehicle 102 (see FIG. 1) moves about in the environment 100. As discussed hereinbefore, the MIATD 200 scans (step 302) radio frequencies to collect (step 304) an identifier of a mobile communication device associated with one of the people 104 within range of the vehicle 102. More specifically, the scanning is carried out by the wireless LAN adapter 208.

When mobile communication device users leave Wi-Fi turned on for their mobile communication devices, the mobile communication device is constantly sending out a Wi-Fi beacon. The Wi-Fi beacon can generally be detected within a particular range of the mobile communication device. The wireless capture range of the USB Wi-Fi adapter has been tested in an indoor setting to be typically 30 meters. The outdoor range is greater than 30 meters but cannot be accurately determined since the range depends on several environmental factors. Since, the MIATD 200 is placed within a moving vehicle, we can safely assume the range is approximately 30 meters. It is known that it is possible to determine an identity for a manufacturer of a Wi-Fi chipset from the first six characters of a Media Access Control (MAC) address received as part of the Wi-Fi beacon. For example, using a Organizationally Unique Identifier (OUI) lookup tool, a MAC with the leading six characters "8C-71-F8" can be associated with a manufacturer named "Samsung." Each manufacturer has a set of unique OUIs and those OUIs are tied to a type of chipset.

In general, a Wi-Fi chipset used in smartphones is distinct from a Wi-Fi chipset used in tablet computers and both of those are distinct from a Wi-Fi chipset used in laptop computers, which are distinct from a Wi-Fi chipset used in home routers. Accordingly, using the OUI information, the CPU 202 may use the MAC address in a collected impression to determine a device type associated with a particular impression.

Instead of collecting (step 304, FIG. 3) impressions using Wi-Fi beacons, impressions may be collected using another wireless networking protocol, such as Bluetooth. In a manner very similar to the collection of an impression through the receipt of a Wi-Fi beacon from a mobile communication device with the Wi-Fi radio left on, the MIATD 200 may collect (step 304, FIG. 3) an impression through the receipt of a Bluetooth beacon from a mobile communication device with the Bluetooth radio left on.

The wireless LAN adapter 208 may, in some embodiments, be specific to known Wi-Fi frequencies. That is, the wireless LAN adapter 208 may operate according to standards established by the Institute for Electrical and Electronic Engineers (IEEE). These standards include those known by references 802.11b, 802.11a, 802.11g, 802.11n and 802.11ac. The wireless LAN adapter 208 may be chosen specifically for a dual-mode ability to capture surrounding Wi-Fi traffic. This mode is called "monitor mode" where the Wi wireless LAN adapter 208, instead of sending out a Wi-Fi beacon in space, the wireless LAN adapter 208 listens for and captures Wi-Fi beacons sent out by other devices in a space that surrounds the MIATD 200; typically, the space has an approximately 40 meter radius.

The wireless LAN adapter 208 may be implemented, for example, as a TP-Link TL-WN722N Wi-Fi adapter.

On an ongoing basis, the GPS module 206 receives satellite data and is adapted to provide the CPU 202 with longitude and latitude coordinates.

In conjunction with collecting (step 304) the identifier of the mobile communication device, the CPU 202 polls the GPS module 206. The CPU 202 may then process (step 306) the identifier in association with location data representative of the location of the vehicle 102 at the time that the identifier was collected. The identifier in association with the location data may, collectively, be called "impression information." The impression information may also include an indication of the advertising being displayed by the vehicle 102 at the time that the identifier was collected.

Figure 4:
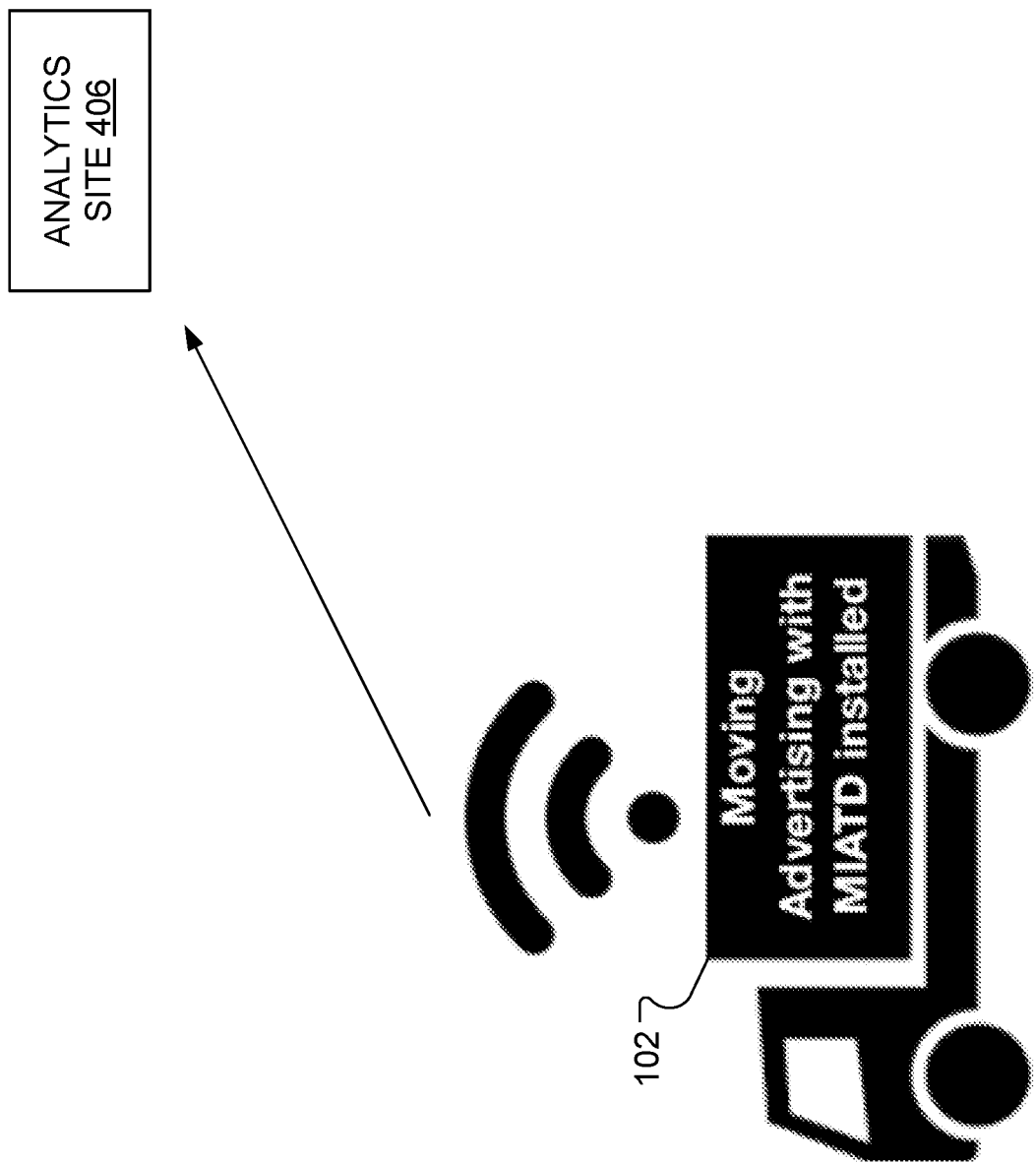
FIG. 4 illustrates the vehicle of FIG. 1 and a representation of transmission of collected data to an analytics site according to aspects of the present application.

In addition to processing (step 306) the impression information, the CPU 202 may also package and transmit (step 308), using the wireless cellular modem 204, the impression information to an analytics site 406 (see FIG. 4). FIG. 4 illustrates the vehicle 102 of FIG. 1 and a representation of transmission (step 308) of collected data to the analytics site 406.

FIG. 5 illustrates example steps in a method to be carried out at the analytics site 406. Initially, the analytics site 406 receives (step 502) the impression information. The analytics site 406 may then determine (step 506) whether a request has been received for an analysis of the impression information. Upon determining (step 506) that such a request has not been received, the analytics site 406 may return to receiving (step 502) further impression information. Upon determining (step 506) that such a request has been received from a requestor, the analytics site 406 may analyze (step 508) the impression information to generate analytics. Analytics is the discovery, interpretation and communication of meaningful patterns in data. Particular analytics that may be of interest to a given advertiser may include analytics related to such factors as location, time and frequency.

One result of analyzing (step 508) the impression information may be a so-called heat map of impressions collected while the vehicle carried out a route. Such a heat map may illustrate more darkly colored areas corresponding to a greater density of collected impressions.

An advertiser may choose to expand a given moving outdoor advertising campaign to include so-called "Retargeting Abilities." "Retargeting" involves marketing to those mobile devices that have come into contact with a Moving Outdoor Advertising Campaign. Such marketing to the mobile devices may, for example, involve transmitting, to a retargeted mobile device, a text-based advertising message via the well-known short messaging service (SMS). Such marketing to the mobile devices may, for another example, involve causing a banner advertisement to appear on a retargeted mobile device, where the banner advertisement is embedded in mobile website, embedded in a downloaded app or embedded in a mobile game.

Conveniently, retargeting enables a Moving Outdoor Advertising campaign to move beyond effectiveness as an Awareness Advertising initiative. Indeed, by enhancing, through the addition of retargeting, a Moving Outdoor Advertising campaign, the campaign becomes a Conversion-Based Advertising Campaign. Conversion-Based Advertising Campaign are known to be advantageous because of an ability to generate ROI analytics, gross profit analytics and profit analytics. Accordingly, by using an enhanced Moving Advertising Campaign, an Advertiser is in a position to measure a true effectiveness and make adjustments with an eye to reaching goals set out in advertising budgets.

Cost per thousand (CPM) is a common method for pricing advertising on the world wide web. Advertisers frequently measure the success of a CPM campaign by its click-through rate (CTR), the ratio of the number of times an ad is clicked compared to the total number of ad impressions. For example, an advertisement that receives two clicks for every 100 impressions has a CTR of 2%. An advertisement's success cannot be measured by CTR alone because an ad that is viewed but not clicked on may still leave and impression.

It is contemplated that aspect of the present application may be billed to clients on a CPM basis. Additionally, a price for each conversion may also be used to bill clients. For a comprehensive strategy for managing on-line advertising using metrics, the methods of U.S. Pat. No. 7,734,503 may be reviewed. Indeed, many of the strategies promoted in U.S. Pat. No. 7,734,503 may be employed in conjunction with aspects of the present application.

Beacon technology is one name for a type of advertising that is displayed statically, that is, displayed on a bus shelter or other immobile structure. Such advertising may be associated with a beacon that that may collect identifiers of nearby mobile communication devices. Aspects of the present application may be differentiated from beacon technology since beach technology lacks location or GPS tracking capabilities. Indeed, for an immobile structure, there is little need to associate an identifier with location data, such as is proposed in aspects of the present application.

It may be considered that mobile, or so-called "moving billboard," advertising does not have the downfall, associated with beacon technology, of recording an impression where there has been no impression, such as when a person associated with a mobile device passes behind a static advertisement, thereby not seeing the static advertisement and, yet, the beacon technology records an impression.

To date, mobile advertising has not been able to be priced as a conversion-based model due to it not being possible or not being accurate enough for it to be viable. Aspects of the present application may be seen to enable accurate measurement of mobile advertising effectiveness by allowing advertisers to track conversions. This mobile tracking of conversion may be seen to significantly change the landscape of moving outdoor advertising and the ability of moving outdoor advertising to be an effective advertising medium.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of processing impression information from a vehicle having advertising displayed exterior to the vehicle, the method being performed by an analytics system and comprising:
   receiving:
      an identifier of a mobile communication device obtained from scanning radio frequencies using a radio scanner of the vehicle, and
      vehicle location information determined from a global positioning module of the vehicle; and
   determining that the vehicle was in proximity to the mobile communication device;
   performing analytics on the identifier and the vehicle location information, including processing the vehicle location information with a time that the identifier was collected, and the analytics including a frequency or a number of impressions of the advertising in association with the identifier of the mobile communication device; and
   when the vehicle was in the proximity to the mobile communication device, transmitting an advertising message to the mobile communication device over wireless mobile telecommunications technology, wherein the advertising message is based on the vehicle location information and the advertising displayed external to the vehicle.

2. The method of claim 1 wherein the radio scanner includes a wireless local area network adapter operates according to a Wi-Fi standard or a Bluetooth standard, wherein the identifier includes a media access control (MAC) address associated with a wireless networking chipset for the mobile communication device.

3. The method of claim 1 wherein the performing analytics includes associating the frequency or the number of impressions of the advertising in association with content of the advertising.

4. The method of claim 1 wherein the performing analytics includes associating the identifier of the mobile communication device with content of the advertising.

5. The method of claim 1 wherein the performing analytics includes performing time analytics on the identifier, the advertising, and the vehicle location information.

6. The method of claim 1 wherein the performing analytics includes determining return on investment of, or profit from, the advertising displayed exterior to the vehicle.

7. The method of claim 1 wherein the performing analytics includes determining effect of the frequency or the number of impressions on conversion to a paying customer.

8. The method of claim 1 wherein the performing analytics includes generating a heat map based on impressions of the advertising of scanned mobile communication devices from the radio scanner of the vehicle.

9. The method of claim 1 wherein the performing analytics includes analyzing location, time, and frequency of impressions of the advertising of scanned mobile communication devices from the radio scanner of the vehicle.

10. The method of claim 1 wherein the performing analytics includes determining a total number of the impressions which includes both i) the identifier of the mobile communication device, and ii) the transmitting the advertising message to the mobile communication device over the wireless mobile telecommunications technology.

11. The method of claim 10 wherein the performing analytics includes determining a click-through rate (CTR) of a number of times the advertising message is clicked compared to the total number of impressions.

12. A system for processing impression information from a vehicle having advertising displayed exterior to the vehicle, comprising:
   an analytics system configured to:
   receive:
      an identifier of a mobile communication device obtained from scanning radio frequencies using a radio scanner of the vehicle, and
      vehicle location information determined from a global positioning module of the vehicle;
   determine that the vehicle was in proximity to the mobile communication device; and
   perform analytics on the identifier and the vehicle location information, including processing the vehicle location information with a time that the identifier was collected, the analytics including a frequency or a number of impressions of the advertising in association with the identifier of the mobile communication device; and
   when the vehicle was in the proximity to the mobile communication device, transmit an advertising message to the mobile communication device over wireless mobile telecommunications technology, wherein the advertising message is based on the vehicle location information and the advertising displayed external to the vehicle.

13. The system of claim 12 wherein the radio scanner includes a wireless local area network adapter operates according to a Wi-Fi standard or a Bluetooth standard, wherein the identifier includes a media access control (MAC) address associated with a wireless networking chipset for the mobile communication device.

14. The system of claim 12 wherein the performing analytics includes associating the frequency or the number of impressions of the advertising in association with content of the advertising.

15. The system of claim 12 wherein the performing analytics includes associating the identifier of the mobile communication device with content of the advertising.

16. The system of claim 12 wherein the performing analytics includes performing time analytics on the identifier, the advertising, and the vehicle location information.

17. The system of claim 12 wherein the performing analytics includes determining return on investment of, or profit from, the advertising displayed exterior to the vehicle.

18. The system of claim 12 wherein the performing analytics includes determining effect of the frequency or the number of impressions on conversion to a paying customer.

19. The system of claim 12 wherein the performing analytics includes generating a heat map based on impressions of the advertising of scanned mobile communication devices from the radio scanner of the vehicle.

20. The system of claim 12 wherein the performing analytics includes analyzing location, time, and frequency of impressions of the advertising of scanned mobile communication devices from the radio scanner of the vehicle.

21. The system of claim 12 wherein the performing analytics includes determining a total number of the impressions which includes both i) the identifier of the mobile communication device, and ii) the transmitting the advertising message to the mobile communication device over the wireless mobile telecommunications technology.

22. The system of claim 12 wherein the performing analytics includes determining a click-through rate (CTR) of a number of times the advertising message is clicked compared to the total number of impressions.

\* \* \* \* \*

UNITED STATES PATENT AND TRADEMARK OFFICE
CERTIFICATE OF CORRECTION

| | | |
|---|---|---|
| PATENT NO. | : 11,694,223 B2 | Page 1 of 1 |
| APPLICATION NO. | : 17/540922 | |
| DATED | : July 4, 2023 | |
| INVENTOR(S) | : Casey Mansel Binkley and Zachary Aaron Levy | |

It is certified that error appears in the above-identified patent and that said Letters Patent is hereby corrected as shown below:

On the Title Page

"(63) Continuation of application No. 16/012,278, filed on Jun. 19, 2018, now Pat. No. 11,222,355." should read -- (63) Continuation of application No. 16/012,278, filed on May 19, 2018, now Pat. No. 11,222,355. --.

Signed and Sealed this
Second Day of September, 2025

Coke Morgan Stewart
*Acting Director of the United States Patent and Trademark Office*